United States Patent Office 3,519,950
Patented July 7, 1970

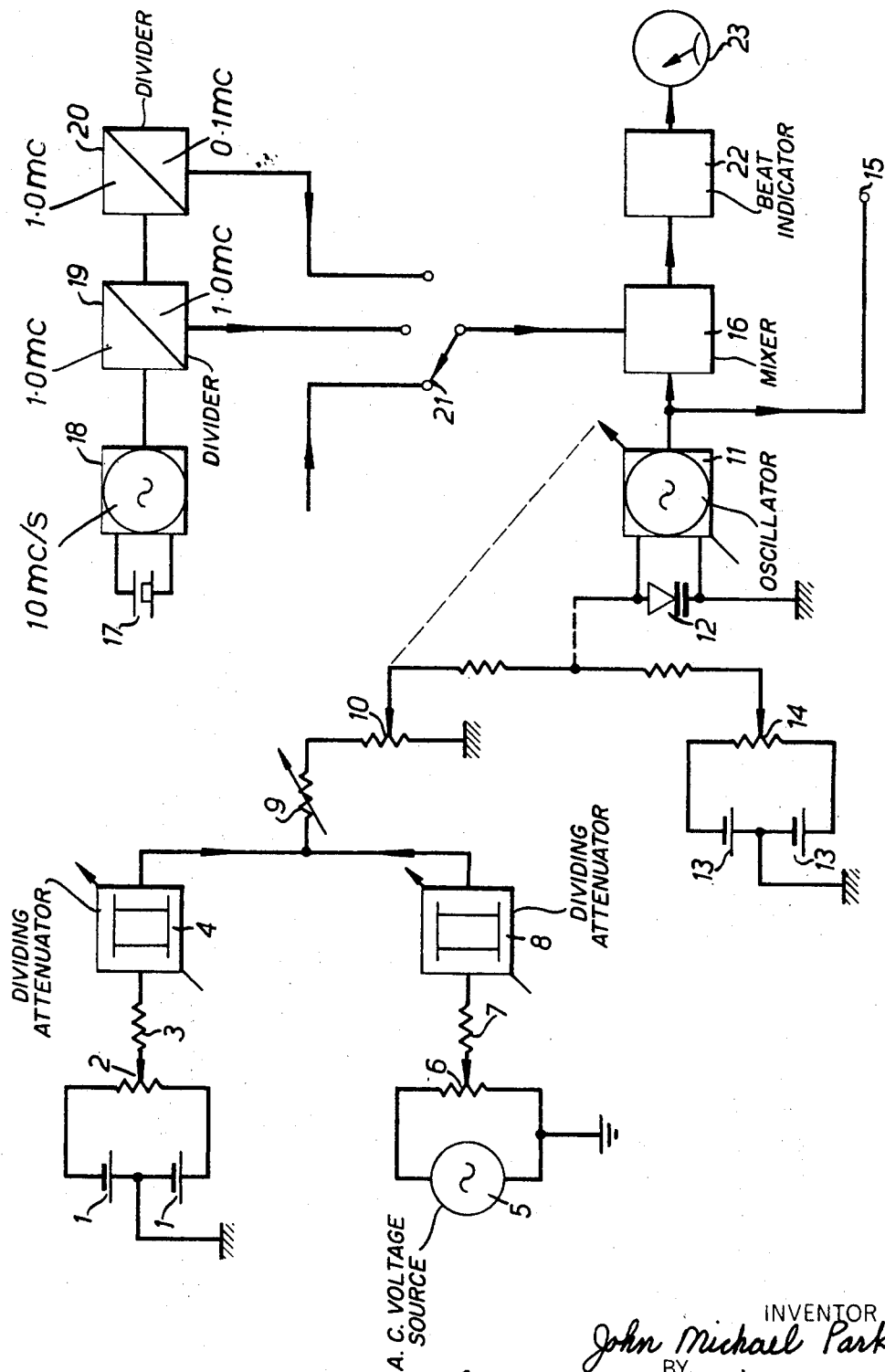

3,519,950
SIGNAL GENERATORS
John Michael Parkyn, St. Albans, Hertfordshire, England, assignor to Marconi Instruments Limited, London, England, a British company
Filed July 8, 1968, Ser. No. 743,210
Claims priority, application Great Britain, July 10, 1967, 31,684/67
Int. Cl. H03b 21/00
U.S. Cl. 331—40                             7 Claims

ABSTRACT OF THE DISCLOSURE

In a signal generator for producing frequency modulated waves with accurate modulation and frequency shift, outputs from calibrated adjustable sources of D.C. voltage and modulating frequency voltage are combined and fed via an attenuator and a potentiometer to a carrier frequency oscillator including a varactor diode, all of which are adjustable. The potentiometer and oscillator are ganged. Signals are superimposed at the oscillator from a further D.C. voltage source. The oscillator and a calibrated standard frequency source feed a mixer, the output of which indicates beats between its inputs on an instrument.

This invention relates to signal generators and more particularly to signal generators for the production of frequency modulated waves. The object of the invention is to provide improved generators which, though relatively simple, may be adjusted to produce desired frequency modulated waves with high accuracy both as regards the modulation and frequency shift ($\Delta f$). Signal generators capable of producing frequency modulated waves of high accuracy in the two respects named are commonly required in test and calibration equipments for testing and calibrating radio receivers and similar apparatus.

According to this invention a signal generator adapted to produce frequency modulated waves comprises in combination a calibrated adjustable source of D.C. voltage; a calibrated adjustable source of modulating frequency voltage said source being similar to the first mentioned source in the respect that full scale on the calibration scales of both represent the same peak to peak voltage and both feed into impedances of the same value; means for combining in parallel adjusted outputs from the aforesaid two sources; a common adjustable attenuator for the combined resultant; a manually adjustable potentiometer fed with output from said attenuator; a carrier frequency oscillator of manually adjustable frequency and including voltage-sensitive electronic frequency adjustment means, the manual adjustment means of said oscillator being ganged with the manual adjustment means of the aforesaid potentiometer and the voltage sensitive electronic frequency adjustment means of said oscillator being fed with voltage from said potentiometer superimposed upon voltage from a second adjustable D.C. voltage source; a mixer fed with output from said oscillator and arranged to receive, as its second input, waves of a selected frequency from a calibrated oscillation source adapted to serve as a "standard"; and indicating means for indicating the existence of any beat frequency between the two inputs to the mixer. The calibrated oscillation source may be incorporated in the signal generator or the latter may be provided with a terminal for the feeding thereto of "standard" oscillations from a separate calibrated oscillation source which is, whether separate or not, preferably a crystal controlled source adapted to provide any of a number of accurately predetermined frequencies.

Preferably the voltage-sensitive electronic frequency adjustment means is constituted by a varactor diode.

Preferably the calibrated adjustable source of D.C. voltage is a symmetrical source comprising a D.C. source connected across the resistance of a potentiometer the slider of which feeds into a range dividing attenuator through a resistance providing a constant source impedance; the calibrated source of modulating frequency comprises an A.C. voltage source connected across the resistance of another potentiometer the slider of which feeds into a second range dividing attenuator through a second resistance providing a constant source impedance; and the two resistances providing constant source impedance are equal.

Preferably also the second adjustable D.C. voltage source is a symmetrical source comprising a D.C. voltage source connected across a further potentiometer resistance the slider of which is connected to one side of the electronic frequency adjustment means of the oscillator.

The invention is illustrated in the accompanying drawing which is a simplified diagram of one embodiment.

Referring to the drawing a calibrated symmetrical and adjustable D.C. voltage source comprises a D.C. potential source 1 having an earthed centre point and connected across the resistance of a potentiometer 2 the slider of which is connected through a resistance 3 to the input side of an adjustable range dividing attenuator 4. A calibrated adjustable A.C. voltage source comprises an A.C. voltage source 5 connected across the resistance of a potentiometer 6 the slider of which is connected through a resistance 7 to the input side of another adjustable range dividing attenuator 8. The resistances 3 and 7 provide constant source impedances. The two calibrated sources, one of D.C. voltage and the other of A.C. voltage and which (as will be apparent later) determine the frequency shift $\Delta f$ and the frequency modulation respectively are similar in the sense that full scale on each source represents the same peak-to-peak voltage, the two resistances 3 and 7 being equal. The attenuators 4 and 8 are constant impedance devices of known form with equal source impedances equal to the value of each of the resistances 3 and 7.

The outputs from the attenuators 4 and 8 are combined in parallel and fed through a common adjustable control resistance 9 to a so-called "drive" potentiometer 10. The control resistance 9 serves for full scale setting and the slider of the potentiometer 10 is ganged (as indicated by the broken line) with the manual tuning control of an adjustable frequency oscillator 11 which incorporates also voltage-sensitive electronic tuning control by means of a varactor diode 12 which is included in a frequency determining circuit of the oscillator. The expedient of ganging the manual control of the drive potentiometer with the manual control of the oscillator is common in frequency modulated signal generators of the nature here in question in order to obtain a constant deviation with a variable carrier frequency but "tracking" errors occurring with such ganging are also the commonest cause of error in such known generators. In the illustrated embodiment accuracy of tracking is ensured by the voltage sensitive electronic tuning provided by the varactor diode 12 the control voltage applied to which is the combination of voltage from the slider of the drive potentiometer 10 with voltage from an additional symmetrical source of D.C. potential comprising the D.C. potential source 13 with its earthed centre point and the potentiometer 14. The slider of the potentiometer 14 supplies a small "shift" voltage which serves to provide, electrically, zero setting as respects the fine frequency shift ($\Delta f$).

The oscillator output which may be taken off for utilisation at an output terminal 15 is supplied as one input to a mixer 16 whose second input is a selectable "standard" frequency obtainable from a crystal oscillator standard which may be incorporated in the generator or may be an entirely separate unit. As shown it comprises a crystal 17, an oscillator 18 controlled thereby and a chain of dividers represented by the blocks 19 and 20. The frequencies indicated by the legends on the blocks 18, 19 and 20 are practical but are given by way of example only. The "standard" frequency required for any particular test or measurement is selected by the switch 21 and fed as the second input to the mixer 16. The known frequency selected by the switch 16 beats with the other input to the mixer 16 and the output from the said mixer is fed to any suitable indicator arrangement adapted to indicate any beat output present. In the illustrated embodiment the beat indicator arrangement is represented as comprising a so-called "diode pump" 22 feeding into an indicating instrument 23.

The method of operation of the apparatus is as follows: The frequency modulating voltage at the slider of the potentiometer 6 is adjusted to zero and the slider of the potentiometer 2 is set to its central zero so that the shift voltage at this slider is also zero. The manual tuning of the oscillator 11 is then adjusted until approximately zero beat with the "standard" frequency selected by the switch 21 is indicated by the instrument 23. Accurate adjustment to zero beat is then obtained by adjusting the slider of the potentiometer 14. The potentiometer 2, which is the Δf control, is then set to one of the marks on its calibration scale (in normal practice at 100 kc./s. intervals) but, owing to almost inevitable "tracking" errors as between the control of the potentiometer 10 and tuning control of the oscillator 11, a beat frequency which will be indicated by the instrument 23 will usually be delivered by the mixer 16. The trimming control rheostat 9 is then adjusted to restore zero beat. The shift frequency Δf part of the equipment will now have been adjusted to a high degree of accuracy equal to that of the crystal oscillator standard and because there is accurate equality of the frequency modulation system in the channel between the source 5 and the resistance 8 with the shift frequency system in the channel between the source 1 and the said resistance 8 there will be a similar high standard of accuracy as respects the frequency modulation part of the equipment.

I claim:

1. A signal generator adapted to produce frequency modulated waves said generator comprising in combination a calibrated adjustable source of D.C. voltage; a calibrated adjustable source of modulating frequency voltage, said source being similar to the first mentioned source in the respect that full scale on the calibration scales of both represent the same peak to peak voltage and both feed into impedances of the same value; means for combining in parallel adjusted outputs from the aforesaid two sources; a common adjustable attenuator for the combined resultant; a manually adjustable potentiometer fed with output from said attenuator; a carrier frequency oscillator of manually adjustable frequency and including voltage-sensitive electronic frequency adjustment means, the manual adjustment means of said oscillator being ganged with the manual adjustment means of the aforesaid potentiometer and the voltage sensitive electronic frequency adjustment means of said oscillator being fed with voltage from said potentiometer superimposed upon voltage from a second adjustable D.C. voltage source; a mixer fed with output from said oscillator and arranged to receive, as its second input, waves of a selected frequency from a calibrated oscillation source adapted to serve as a "standard;" and indicating means for indicating the existence of any beat frequency between the two inputs to the mixer.

2. A signal generator as claimed in claim 1 wherein the calibrated oscillation source is incorporated in the signal generator.

3. A signal generator as claimed in claim 1 and having a terminal for the feeding thereto of "standard" oscillations from a separate calibrated oscillation source.

4. A signal generator as claimed in claim 1 wherein the oscillation source providing the "standard" oscillations is a crystal controlled source adapted to provide any of a number of accurately predetermined frequencies.

5. A signal generator as claimed in claim 1 wherein the voltage-sensitive electronic frequency adjustment means is constituted by a varactor diode.

6. A signal generator as claimed in claim 1 wherein the calibrated adjustable source of D.C. voltage is a symmetrical source comprising a D.C. source connected across the resistance of a potentiometer the slider of which feeds into a ranged dividing attenuator through a resistance providing a constant source impedance; the calibrated source of modulating frequency comprises an A.C. voltage source connected across the resistance of another potentiometer the slider of which feeds into a second ranged dividing attenuator through a second resistance providing a constant source impedance; and the two resistances providing constant source impedance are equal.

7. A signal generator as claimed in claim 1 wherein the second adjustable D.C. voltage source is a symmetrical source comprising a D.C. voltage source connected across a further potentiometer resistance the slider of which is connected to one side of the electronic frequency adjustment means of the oscillator.

References Cited

UNITED STATES PATENTS 3,260,959   7/1966   Broadhead _____ 331—177

JOHN KOMINSKI, Primary Examiner

U.S. Cl. X.R.

334—15; 331—177